United States Patent
Rowley

(10) Patent No.: US 8,145,845 B2
(45) Date of Patent: Mar. 27, 2012

(54) LIMITED LIFE VIRTUAL ATTRIBUTE VALUES

(75) Inventor: Peter A. Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 885 days.

(21) Appl. No.: 11/606,494

(22) Filed: Nov. 29, 2006

(65) Prior Publication Data

US 2008/0126435 A1   May 29, 2008

(51) Int. Cl.
   *G06F 12/00*   (2006.01)
(52) U.S. Cl. ........................................ 711/133; 709/245
(58) Field of Classification Search .................... 711/133
   See application file for complete search history.

(56) References Cited

U.S. PATENT DOCUMENTS

| | | | |
|---|---|---|---|
| 7,051,114 B1 * | 5/2006 | Ravishankar et al. | 709/245 |
| 2004/0054808 A1 * | 3/2004 | Ekberg | 709/245 |
| 2004/0059719 A1 * | 3/2004 | Gupta et al. | 707/3 |
| 2007/0233957 A1 * | 10/2007 | Lev-Ran et al. | 711/118 |

* cited by examiner

*Primary Examiner* — Reginald Bragdon
*Assistant Examiner* — Hamdy S Ahmed
(74) *Attorney, Agent, or Firm* — Lowenstein Sandler PC

(57) ABSTRACT

A method and apparatus for retrieving data from a Lightweight Directory Access Protocol (LDAP) repository. In one embodiment, the method includes receiving a request for data in a lightweight directory access protocol (LDAP) directory. The method may further include checking any one or more of an LDAP cache and an LDAP index for an LDAP attribute pertaining to requested data, the checking comprising determining if a time-to-live for the LDAP attribute or the LDAP index has expired, and returning the data to the client.

13 Claims, 5 Drawing Sheets

LIMITED LIFE VIRTUAL ATTRIBUTE VALUES

TECHNICAL FIELD

Embodiments of the present invention relate to a Lightweight Directory Access Protocol (LDAP), and more specifically to a method and apparatus for managing cached and indexed attribute validity using time-to-live indicators.

BACKGROUND

Light Weight Directory Access Protocol (LDAP) has become very popular due to its efficient and fast data access. A large number of applications/services are currently in use and being developed which utilize an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

The contents of the entries are governed by an LDAP directory schema. The schema defines object classes and each entry has an objectClass attribute containing named classes defined in the schema. The objectClass attribute may be multivalued and contain the class "top" as well as some number of other classes. The schema definition for each class an entry belongs to defines what kind of object the entry may represent (e.g., a person, organization or domain). Membership in a particular class gives the entry the option of containing one set of attributes (optional attributes), and the obligation of containing another set of attributes (mandatory or required attributes). For example, an entry representing a person might belong to the class "person." Membership in the "person" class would require the entry to contain the "sn" and "cn" attributes, and allow the entry also to contain "userPassword," "telephoneNumber," and other attributes. An LDAP directory server may access specific data items in the LDAP directory in response to a client request.

The LDAP server retrieves attributes and entries from the LDAP directory that are stored in the LDAP repository. The attributes and entries may be requested by a query including a filter. A query may request specific entries, attributes or attribute values. A query may include a filter which defines a search for LDAP entries by specifying search terms such as attributes and attribute values of desired entries. The filter may include logic defining the relationship between search terms. Some of the LDAP entries, attributes and attribute values that are requested may be stored in a cache or indexed. Some of the requested attributes or search terms may be virtual attributes. Virtual attributes are not cached or indexed, because they frequently change and there is no mechanism for accounting for the change in the LDAP server. Some attributes may also change such that the LDAP server is not aware of the changes and the cache and index become inaccurate.

BRIEF DESCRIPTION OF THE DRAWINGS

The present invention is illustrated by way of example, and not by way of limitation, in the figures of the accompanying drawings and in which.

DETAILED DESCRIPTION

Figure 1:
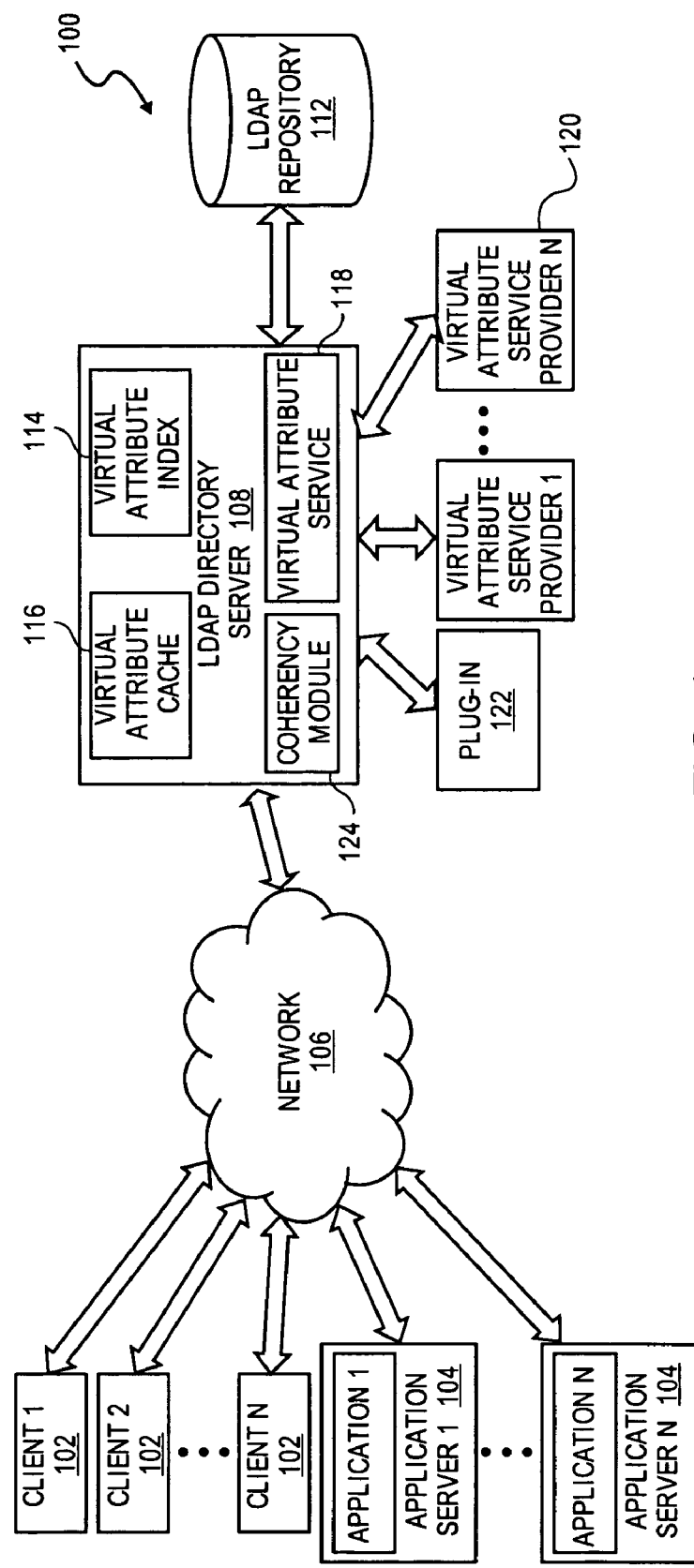
FIG. 1 is a diagram of one embodiment of a network and system including a lightweight directory access protocol (LDAP) server.

The embodiments of the present invention provide a time-to-live (TTL) indicator for each data item in a cache, index, virtual cache or virtual index. The TTL indicator may be provided by a virtual attribute service provider or similar source. The TTL indicator is used to allow the determination of whether an associated data item in a cache, index, virtual cache, virtual index or similar data structure is accurate an reliable. This may be used by the LDAP server to avoid the use of data items in a cache, index, virtual cache, virtual index or similar data structure that may only be valid or accurate during the time period designated by the TTL. This allows the caching and indexing of data that changes without the LDAP server and the associated cache, index, virtual cache or virtual index being updated.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"), random access memory ("RAM"), magnetic disk storage media; optical storage media, flash memory devices or other type of machine-accessible storage media.

FIG. 1 is a diagram of one embodiment of a network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs) or similar devices capable of communicating over the network 106 and running an LDAP client.

The clients 102 are coupled to the LDAP directory server 108 via the network 106, which may be a public network (e.g., Internet) or a private network (e.g., a virtual local area network (VLAN)). The LDAP directory server 108 may contain a server front-end responsible for network communications, plugins or modules for server functions (such as access control and replication), a basic directory tree containing server-related data and a database back-end or plugin responsible for managing the storage and retrieval of LDAP repository data.

In one embodiment, the clients 102 communicate with the LDAP directory server 108 via a web server (not shown). For example, the clients 102 may execute web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112. Clients may be any application or program capable of generating an LDAP request based on user input or the automated processes of the application or program.

The network architecture 100 may also include one or more application servers 104 that hosts various applications that may request information from the LDAP directory server 108. The application servers 104 operate as clients in communication with the LDAP directory server 112. Similar to the clients 102, the application servers 104 may communicate with the LDAP directory server 112 directly or via a web server. Application servers 104 may be any machine or set of machines capable of providing or supporting any number of applications that may generate LDAP requests.

The LDAP repository 112 may be part of the LDAP directory server 108 or it may reside externally (e.g., on a database server). The LDAP repository 112 may contain a tree of data entries. The structure of the entries may be specified in the definition of the LDAP repository 112. The definition of the LDAP repository 112 may be represented as a schema, a table or some other data structure and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class an entry belongs to defines what kind of object the entry may represent (e.g., a person, organization or domain).

In one embodiment, the LDAP server 108 may include an index and a cache (not shown), a virtual attribute cache 116, a virtual attribute index 114, a virtual attribute service module 118 and similar modules. In other embodiments, these modules may be implemented as plugins 122 or similarly implemented to provide services to the LDAP server 108.

The LDAP server 108 may maintain a cache of recently accessed entries or attributes. The cache improves the efficiency of the system by allowing for fast retrieval of the data stored therein in contrast to the comparatively slow search process when retrieving data from the LDAP repository 112. The LDAP server 108 may also provide a virtual attribute cache 116. The virtual attribute cache 116 may store recently accessed virtual attributes. Virtual attributes are not typically stored in a persistent storage system such as the LDAP repository 112. Rather, they are generated by a virtual attribute service 118. The virtual attribute service 118 may obtain virtual attributes from virtual attribute service providers 120. Virtual attribute service providers 120 dynamically generate virtual attributes based on data stored in the LDAP repository or any other source or calculation of data. For example, a virtual attribute service provider may track the online presence of users that are using an instant messaging program, and return the online presence of a user as a virtual attribute.

The LDAP server 108 may maintain an index or set of indices. The index also improves server performance by storing a listing in local memory or storage devices of the entries containing specific attribute values or similar indexed data. The entries in the index may be set by a system administrator, may have default settings or may be similarly maintained. The LDAP server 108 may also maintain a set of virtual attribute indices 114. Virtual attribute indices 114 may track storage locations for virtual attributes.

Caches, indices, virtual caches and virtual indices may include or reference a time-to-live (TTL) indicator for each of the entries in the cache or index. The TTL indicator represents a time after which the associated data cannot be relied upon as being accurate. A cache or virtual attribute cache data item with an expired TTL indicator may be considered invalid, thereby forcing the recalculation of the virtual attribute or the retrieval of the non-virtual attribute. An index or virtual attribute index that has an expired TTL may be rebuilt. The LDAP Server may also include a coherency module 124 to detect modifications to LDAP attribute data and LDAP entries and notify the LDAP cache and the LDAP indices of a modification or initiate a rebuilding of an LDAP index.

Figure 2:
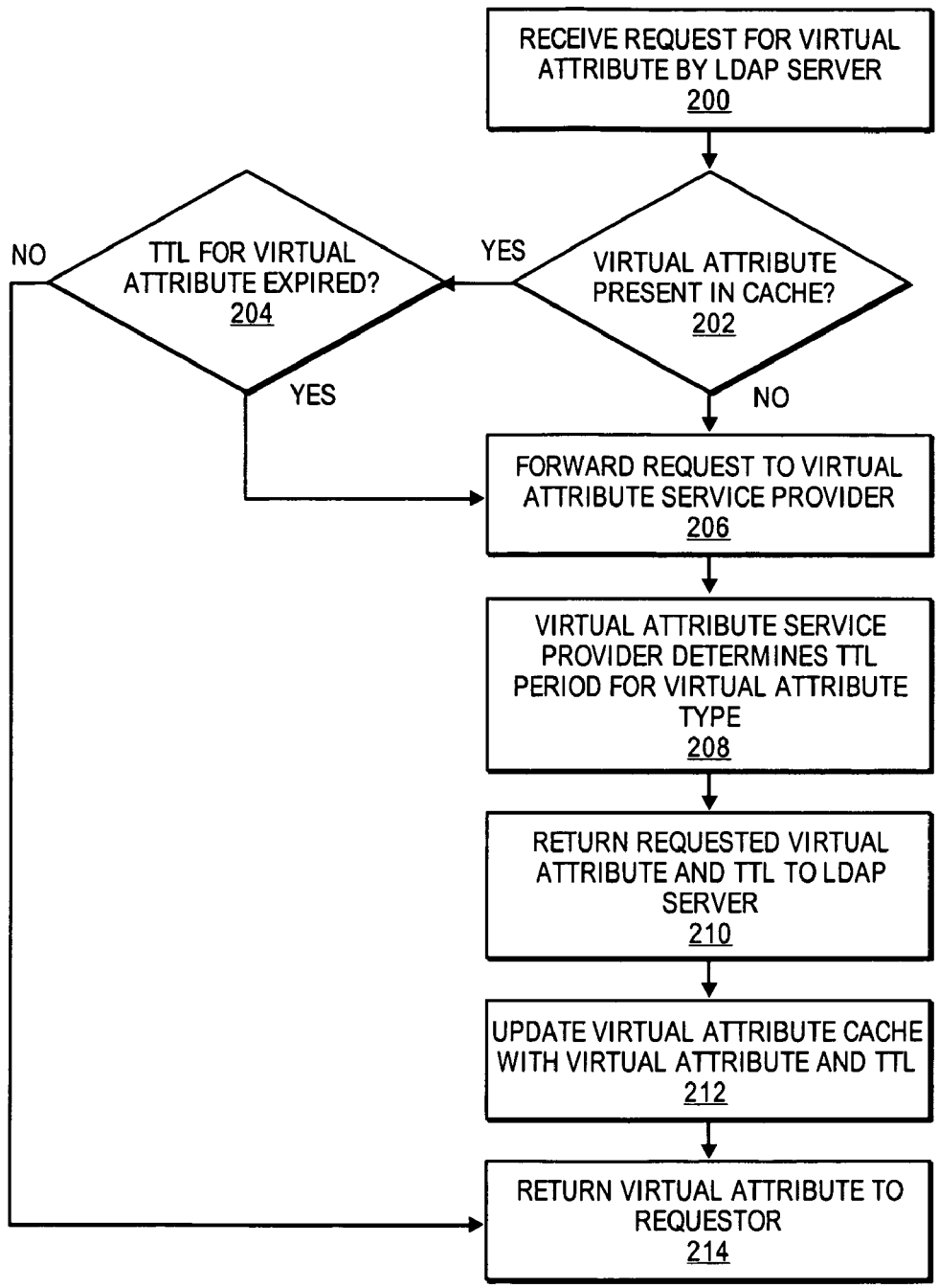
FIG. 2 is a flowchart of one embodiment of a process for servicing a request and managing the cache.

FIG. 2 is a flowchart of one embodiment of a process for servicing a request and managing the cache. The method may be performed by processing logic that may comprise hardware (e.g., circuitry, dedicated logic, programmable logic, microcode, etc.), software (such as instructions run on a processing device) or a combination thereof. In one embodiment, the method is performed by the LDAP directory server 108 including the modules within the LDAP directory server in combination with plugin modules such as the virtual attribute service providers of FIG. 1.

Referring to FIG. 2, the method begins with processing logic receiving a request pertaining to data in an LDAP repository (block 200). The request or query may be received from a client, application server or similar entity and may be in the form of a request for a specific entry, attribute or virtual attribute that may be retrieved from the LDAP cache, virtual attribute cache, repository, a virtual attribute service provider or similar location and returned to the requesting client.

The process may be applied to a cache with support for TTL tracking. For sake of clarity, the example embodiment illustrated in FIG. 2 and discussed herein is a request for a virtual attribute and the management of a virtual attribute cache. One of ordinary skill would understand that the same principles may be applied to the management of a non-virtual attribute cache supporting TTL.

The received request may be a request for a specific virtual attribute, a set of virtual attributes or combinations of virtual and non-virtual attributes. The request may be a simple request, a query including a search filter or a similar LDAP operation. A search filter or other LDAP operation may be evaluated to identify an entry or set of entries to be retrieved and returned to the requester. The query may be further narrowed to return only a specific attribute or set of attributes in an identified set of entries. The retrieval of each of these attributes may be handled in a manner similar to that set forth below. For sake of clarity, an example embodiment of a simple request for a virtual attribute is provided. One of ordinary skill in the art would understand that the method is also applicable to other types of LDAP operations and to non-virtual attribute caches that utilize a time-to-live indicator for the cache entries.

The virtual attribute cache may be checked to determine if the requested data is stored therein (block 202). If the requested data is present then the validity of the data and the TTL indicator are checked (block 204). The data may be invalidated based on cache management. In addition, the TTL may have expired. The TTL may be an indicator corresponding to real time or may be a relative measurement of the life of the cache data item or any type of indication of the time during which the data item should be considered valid.

If the requested data is not present, the TTL has expired or the data is otherwise invalid, then the LDAP server may request the data from the appropriate virtual attribute service provider (block 206). Any number of virtual attribute service providers may be present in the LDAP system, each of which may provide a different virtual attribute or set of virtual attributes. If the requested data is present, valid and the TTL has not expired, then the data may be retrieved from the virtual attribute cache and returned to the requesting client, application server or LDAP operation (block 214).

A virtual attribute service provider may be a separate plugin or a module of the LDAP server. A virtual attribute service may interact with virtual attribute service providers to manage the communication, retrieval and storage of virtual attributes in the LDAP system. The virtual attribute service provider receives the request for the virtual attribute and generates or retrieves the requested data. The virtual attribute service provider may use any process or algorithm to generate the requested data. The virtual attribute service provider may also generate and determine a TTL for the requested data based on the type of the virtual attribute requested (block 208). Different types of virtual attributes may have different TTL periods. For example, an online status of an individual using an instant messaging program may have a TTL period that is short, because this status changes rapidly and frequently. In contrast, a TTL period for a virtual attribute for the online presence of a resource may have a longer TTL, because the resource is not expected to be offline frequently or for long durations.

The requested virtual attribute and its TTL are returned to the LDAP server from the virtual attribute service provider (block 210). The virtual attribute service may manage this exchange. The returned data and TTL may then be stored in the virtual attribute cache maintained by the LDAP server (block 212). The LDAP server may utilize any type of cache management and replacement scheme for determining which data to keep or replace, such as a least recently used (LRU) or similar mechanism. After the cache has been updated the data may then be returned to the requesting client, application server or LDAP operation. In another embodiment, the TFL indicator for each virtual attribute cache data item may be stored in a separate data structure.

Figure 3:
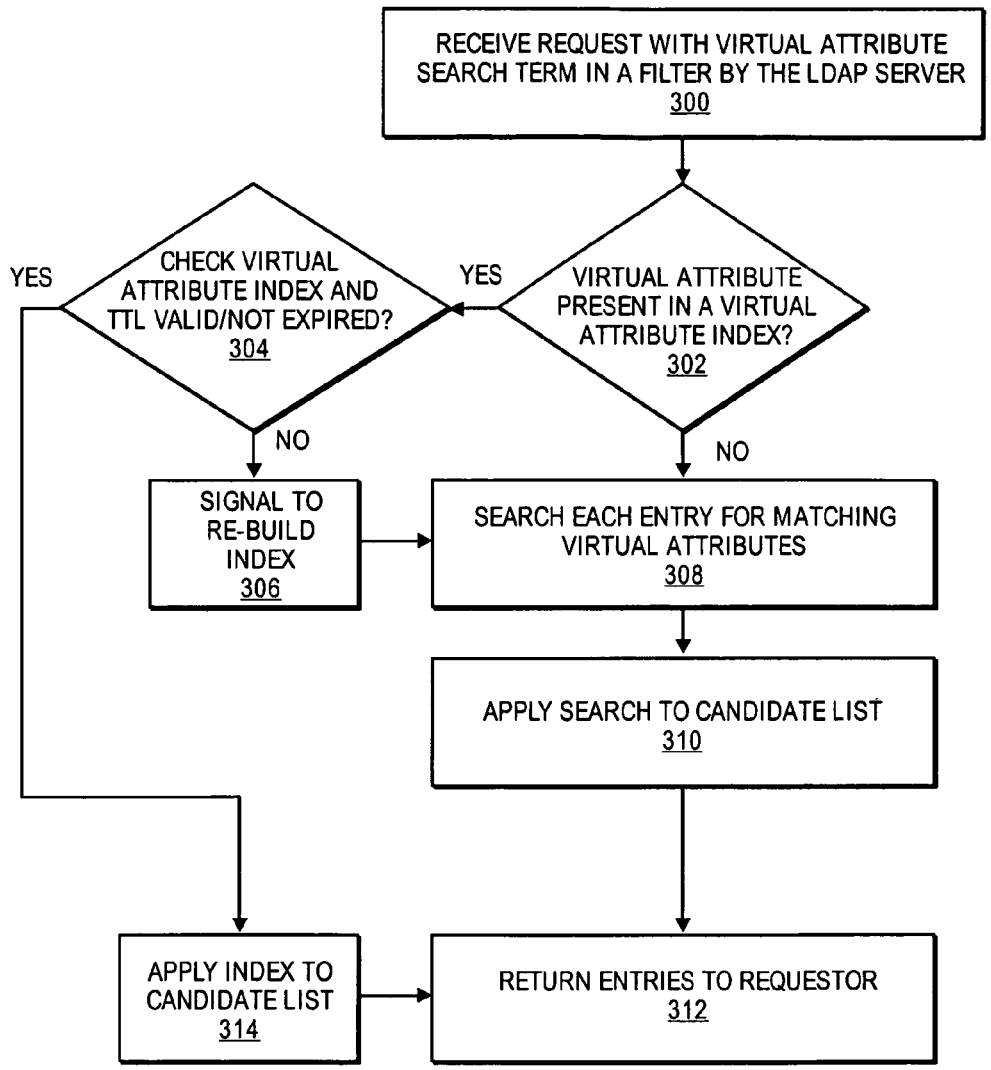
FIG. 3 is a flowchart of one embodiment of a process for servicing a search using an index.

FIG. 3 is a flowchart of one embodiment of a process for servicing a search using the index where TTL is supported. In one embodiment, the process is initiated when a request for data is received by the LDAP server (block 300). The request may be from a client, application server or an LDAP process. The request or data may be a query including a search filter or similar LDAP operations or requests for data. Search filters and similar operations and requests may be evaluated in a sequence or similarly evaluated. For sake of clarity, the process of a simple search filter is described herein. One of ordinary skill in the art would understand that the method may also be applied to more complex searches and LDAP operations. Similarly, the example is a search involving a virtual attribute as a search term where virtual attributes are part of the indexing scheme. The method is also applicable to non-virtual attribute search terms and indexing and may be used in conjunction with caching as described above.

A check may be made to determine if a virtual attribute index for a virtual attribute search term exists (block 302). Non-virtual and virtual attributes may be indexed with key and target pairs where the targets identify the entries in the LDAP repository that contain a particular virtual or attribute value. In one embodiment, the virtual attributes are not stored in the LDAP repository, but are retrieved from virtual attribute service providers in a process that is transparent to the requester.

If the requested virtual attribute is indexed, then a check may be made to determine if the virtual attribute index has an expired TTL or is otherwise invalid (block 304). The TTL tracked for an virtual attribute index or a non-virtual attribute index may be any type of relative or absolute time indicator that corresponds to the duration over which the index may be assumed to be accurate. In another embodiment, separate TTL indicators are present in the virtual attribute index for each data item therein. If a virtual attribute index exists, is valid and the TTL has not expired, then virtual attribute index data may be applied to generate a candidate list or modify an existing candidate list (block 314). A candidate list is a list of data items generated during the evaluation of a search filter to identify the requested set of data items. Each search term is evaluated sequentially. The candidate list starts with a list of all data items that meet the requirements of the first search term and then is modified as each subsequent search term is evaluated. After all the search terms and associated logic have been evaluated, then the resulting list of data items and any associated virtual attributes may be retrieved and returned to the requester (block 312). Further processing may occur on the retrieved data items prior to returning requested data to the requester depending on the type of request.

If the virtual attribute is indexed but the TTL of the index has expired or otherwise been invalidated, then a signal may be sent to initiate the rebuilding of the index (block 306). The rebuilding of the index may be handled by a dedicated index management module, the LDAP server or a module or plugin to the LDAP server.

If the virtual attribute is not indexed or the index is invalid or the TTL has expired, then each entry may be searched to determine those entries that meet the search term requirements (block 308). This process may involve accessing each entry in the LDAP repository for search terms that pertain to non-virtual attributes and obtaining virtual attributes for each entry from the appropriate virtual attribute service provider. The results of this search may then be applied to generate or modify a candidate list (block 310). Each matching data item may be added to the candidate list or the list may be used as a starting point and each data item in the list that does not meet the requirements of the search term may be eliminated from the list.

The data items from the final candidates list may be retrieved along with associated virtual attribute data and may then be further processed and sent to the requesting client, application server or LDAP operation (block 312).

Figure 4:
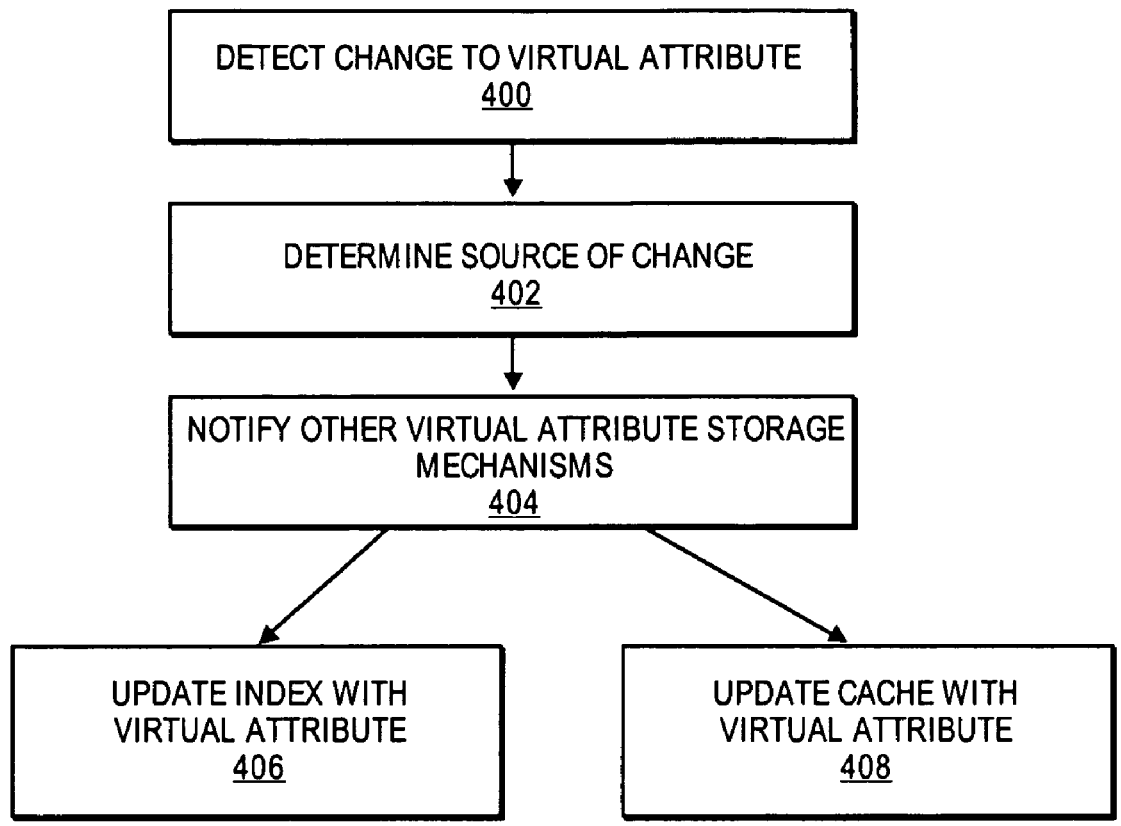
FIG. 4 is a flowchart of one embodiment of a process for updating the cache or index upon detection of a change to attributes, attribute values or entries.

FIG. 4 is a flowchart of one embodiment of a process for updating the cache or index upon detection of a source change. In one embodiment, an algorithm or coherency mechanism is executed by the LDAP server to ensure that the attribute and virtual attribute tracking and storing mechanisms are consistent. For example, if a virtual attribute changes, both the virtual attribute cache and the virtual attribute index may be updated to reflect the change, either by modifying each structure or invalidating them. This process may also be applied to attributes and indices that utilize a TTL indicator.

The process may be triggered by the detection of a change to a non-virtual or virtual attribute (block 400). The change may be detected by actively checking TTL values over time for each cache, index, virtual attribute cache or virtual attribute index. The change may also be detected by monitoring LDAP operations that modify the attributes, indices, virtual attributes or virtual indices, by monitoring notification from virtual attribute service providers or similar detection mechanisms.

The process may determine the source of the change to the attribute or virtual attribute (block 402). The source may be a cache, index, virtual cache, index, repository or similar storage or data structure. The source may be the data at a location that the change has already been made or is about to be made. For example, a new entry may be created in the LDAP repository that include an attribute or virtual attribute that is indexed. The other data structures and components that are tracking the changed data may be notified (block 404). For example, a notification may be sent to a virtual index to invalidate it or initiate the rebuilding of the index (block 406). Rebuilding the virtual index may include determining the relevant virtual attribute value for each entry by requesting this data from the virtual attribute service provider. The virtual attribute service provider may also provide a TTL for each index or attribute value in the index. The notification may be sent to a virtual attribute cache to invalidate a data item or update the virtual attribute cache to include the changed virtual attribute (block 408). One of ordinary skill would understand that similar processes may be applied to other data structures or devices such as caches and indices that implement a TTL.

Figure 5:
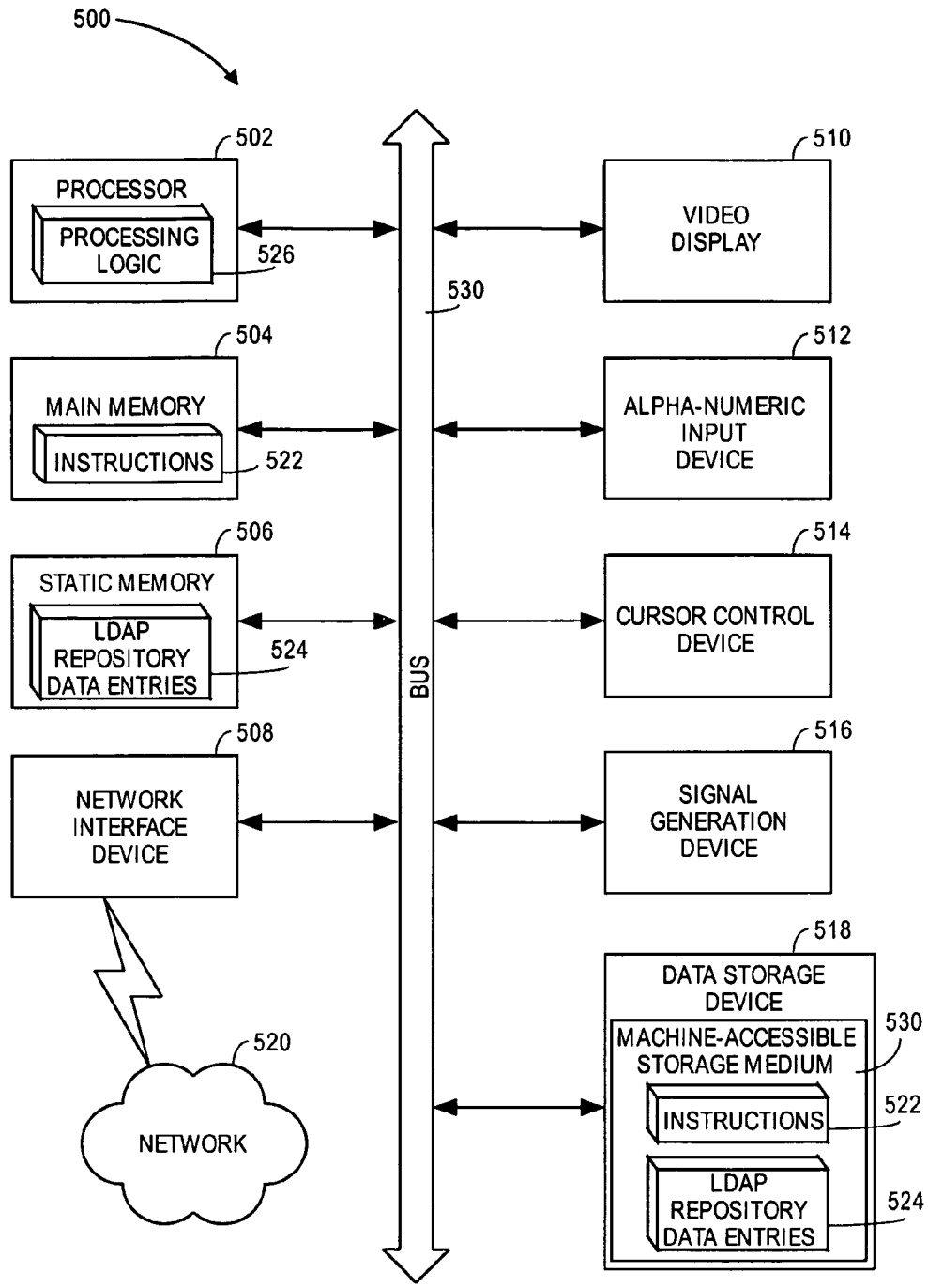
FIG. 5 is a diagram of one embodiment of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet or the Internet. The machine may operate in the capacity of a server or a client machine in client-server network environment or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 may represent one or more general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 600, the main memory 504 and the processing device 502 also constituting machine-accessible storage media. The software 522 may further be transmitted or received over a network 520 via the network interface device 508.

The machine-accessible storage medium 530 may also be used to store LDAP repository data entries 524. LDAP repository data entries 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories and optical and magnetic media.

Thus, a method and apparatus for invoking actions on data via LDAP requests have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer system implemented method comprising:
   receiving from a client a request for data stored in a lightweight directory access protocol (LDAP) repository that is coupled to an LDAP directory server, wherein the request pertains to a virtual LDAP attribute of at least one entry in the LDAP repository;
   determining, by the computer system that the virtual LDAP attribute relating to the request is indexed in an LDAP index in the LDAP directory server;
   determining whether the LDAP index has an expired time-to-live indicator corresponding to the virtual LDAP attribute relating to the request;
   returning the data to the client in response to a determination that the LDAP index does not have an expired time-to-live indicator corresponding to the virtual LDAP attribute; and
   rebuilding the LDAP index in response to a determination that the LDAP index has an expired time-to-live indicator corresponding to the virtual LDAP attribute relating to the request.

2. The method of claim 1, wherein returning the data to the client comprises:
   returning an LDAP entry from the LDAP repository indicated by the LDAP index.

3. The method of claim 1, further comprising:
   receiving a time-to-live from an attribute provider; and
   storing the time-to-live in the LDAP index.

4. The method of claim 1, further comprising:
   determining a time-to-live for a requested virtual LDAP attribute based on a type of the LDAP attribute.

5. The method of claim 1, further comprising:
   checking periodically if each time-to-live value has expired in the LDAP index.

6. A lightweight directory service protocol (LDAP) server computer system comprising:
   a storage device to store virtual LDAP attributes and LDAP entries in a LDAP repository; and
   processing device coupled to the storage device to receive a request from a client for data stored in the LDAP repository, the request pertains to a virtual LDAP attribute of at least one entry in the LDAP repository, to maintain an LDAP index, including a time-to-live indicator corresponding to a virtual LDAP attribute in the LDAP index, the LDAP index to service requests for LDAP data and LDAP entries, to determine that the virtual LDAP attribute relating to the request is indexed in the LDAP index, to determine whether the LDAP index has an expired time-to-live indicator corresponding to the virtual LDAP attribute relating to the request, to return the data to the client in response to a determination that the LDAP index does not have an expired time-to-live indicator corresponding to the virtual LDAP attribute, and to rebuild the LDAP index in response to a determination that the LDAP index has an expired time-to-live indicator corresponding to the virtual LDAP attribute relating to the request.

7. The system of claim 6, wherein the processing device executes a virtual attribute service from memory coupled to the processing device to communicate with a virtual attribute service provider.

8. The system of claim 6 wherein the processing device executes a coherency module from memory coupled to the processing device to detect modifications to LDAP attribute data and LDAP entries and notify the LDAP index of a modification.

9. A non-transitory machine-accessible storage medium including data that, when accessed by a machine, cause the machine to perform a method comprising:
   receiving, by the machine from a client, a request for data stored in a lightweight directory access protocol (LDAP) repository that is coupled to an LDAP directory server, wherein the request pertains to a virtual LDAP attribute of at least one entry in the LDAP repository;
   determining, by the machine, that the virtual LDAP attribute relating to the request is indexed in an LDAP index in the LDAP directory server;
   determining whether the LDAP index has an expired time-to-live indicator corresponding to the virtual LDAP attribute relating to the request; and
   returning the data to the client in response to a determination that the LDAP index does not have an expired time-to-live indicator corresponding to the virtual LDAP attribute relating to the request; and
   rebuilding the LDAP index in response to a determination that the LDAP index has an expired time-to-live indicator corresponding to the virtual LDAP attribute relating to the request.

10. The non-transitory machine-accessible storage medium of claim 9, wherein returning the data to the client comprises:
    returning an LDAP entry from the LDAP repository indicated by the LDAP index.

11. The non-transitory machine-accessible storage medium of claim 9, including further data that, when accessed by the machine, cause the machine to perform the method further comprising:
    receiving a time-to-live from an attribute provider; and
    storing the time-to-live in the LDAP index.

12. The non-transitory machine-accessible storage medium of claim 9, including further data that, when accessed by the machine, cause the machine to perform the method further comprising:
    determining a time-to-live for a requested virtual LDAP attribute based on a type of the LDAP attribute.

13. A computer system implemented method comprising:
    receiving, by the computer system, a request for a virtual lightweight directory access protocol (LDAP) attribute by a LDAP server from a client;
checking an LDAP index in the LDAP server for the virtual LDAP attribute;
checking a time-to-live value for the virtual LDAP attribute stored in the LDAP index of the LDAP server;
initiating re-building of the LDAP index in response to the time-to-live value being expired;
generating a candidate list from non-virtual attributes returned from a search of an LDAP repository and virtual attributes returned from a virtual attribute service provider; and
returning the virtual LDAP attribute from the candidate list to the client.

* * * * *